United States Patent Office 3,227,953
Patented Jan. 4, 1966

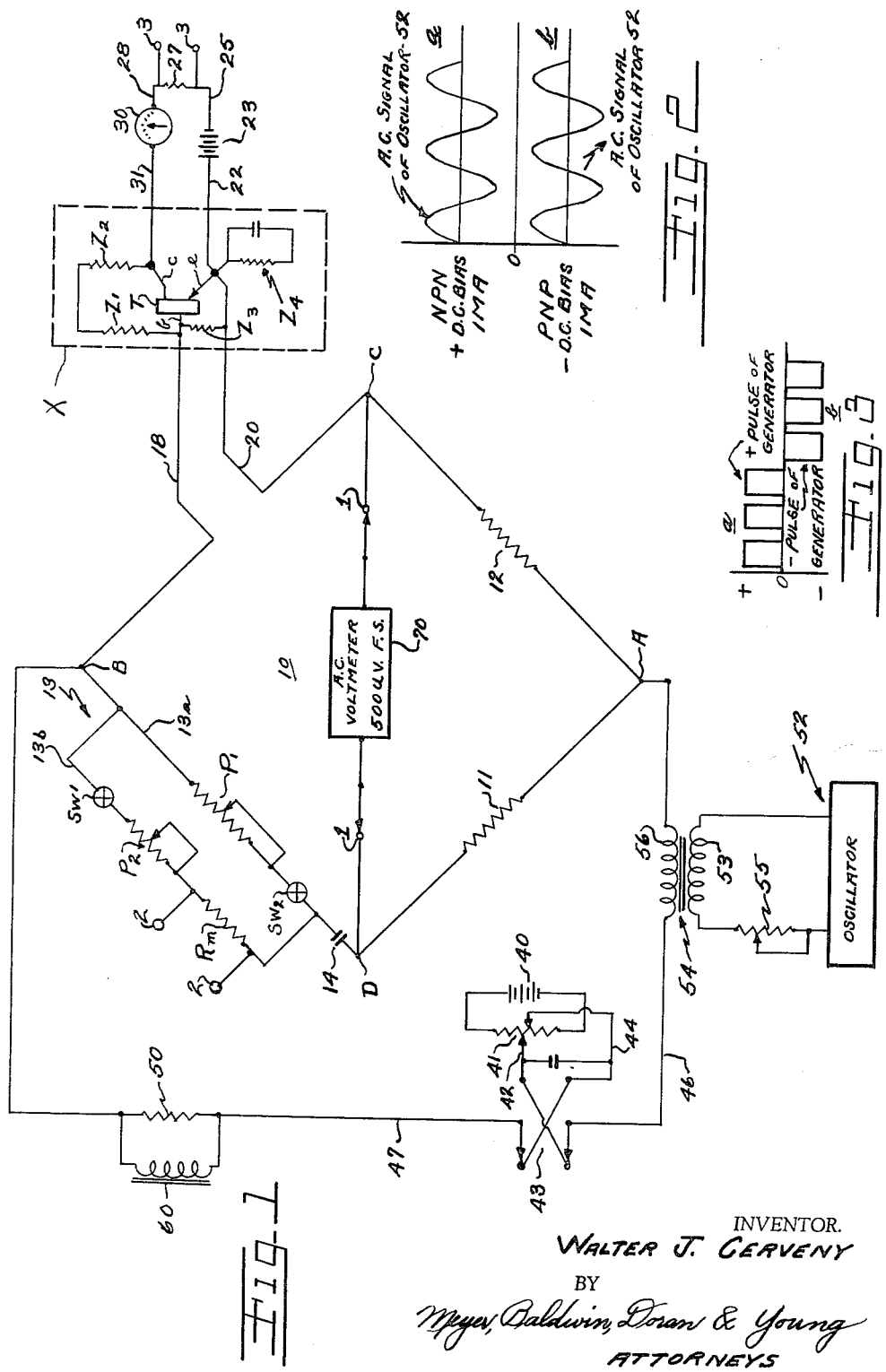

---

3,227,953
BRIDGE APPARATUS FOR DETERMINING THE INPUT RESISTANCE AND BETA FIGURE FOR AN IN-CIRCUIT TRANSISTOR
Walter J. Cerveny, Richmond Heights, Ohio, assignor to The Hickok Electrical Instrument Company, Cleveland, Ohio, a corporation of Ohio
Filed Oct. 6, 1960, Ser. No. 60,848
2 Claims. (Cl. 324—158)

This invention relates to testing apparatus for use in determining operating parameters of semiconductors and particularly transistor and/or diode semiconductor elements while said elements are in their associated circuit.

Heretofore, when it has been desired to determine operating parameters of a semiconductor element of the above type it has been first required to remove said element from its associated operating circuit before it could be applied to the testing apparatus.

As will be recognized by the skilled artisan, because of the very fragile construction of the semiconductor element, its removal and/or replacement out of and into its associated circuit oftentimes causes irreparable damage to the same whereby it is no longer capable of functioning in the manner described, and hence must be replaced.

As will likewise be apparent, transistors and/or diode semiconductor elements are usually soldered into their associated circuitry, and in the process of removing said elements from the latter, preparatory to the application thereof to testing apparatus, whereby heat is applied to the electrode connections, said heat is sufficient in many cases to damage the semiconductor material and/or the circuitry associated therewith whereby the same is required to be partially or completely replaced.

Other disadvantages of the methods and/or testing apparatus in present day use are well known to the artisan whereby the same have enjoyed moderate or limited utility.

It is therefore a primary object of the present invention to provide novel and improved testing apparatus especially designed for determining operating parameters of a semiconductor element in-circuit.

Another object of the present invention is the provision of a new and improved in-circuit testing apparatus especially designed for determining semiconductor operating parameters particularly a transistor and/or diode semiconductor element while said element is in its associated operative circuit and which apparatus functions to electronically null or cancel the effects of the impedances of the circuit associated with said semiconductor while determining the aforesaid operating parameters thereof.

Another object of the present invention is the provision of a new and improved semiconductor in-circuit testing apparatus especially designed for determining operating parameters of a transistor in-circuit, and wherein said apparatus includes impedance bridge means for connecting said transistor in a common-emitter amplifier circuit, means in said impedance bridge for electronically cancelling the effects of the impedance of the circuit associated with said transistor, and means for determining the Beta, current application factor for said transistor.

Another object of the present invention is the provision of novel and improved in-circuit transistor testing apparatus especially designed for testing a transistor while the latter is in its associated circuit, and wherein said apparatus includes an impedance bridge having one branch adapted to be connected to said transistor under test in a common-emitter amplifier circuit, an adjacent branch of said bridge including circuit means selectively adjustable so as to balance the bridge and null or equalize therein the effects of current passing through the input circuit impedance of said associated transistor circuit, and means connected to the output circuit of said transistor in said amplifier circuit effective to determine the Beta, current amplification factor, of said transistor.

Still another object of the present invention is the provision of novel and improved in-circuit transistor testing apparatus as is above defined, and wherein the adjacent branch of the impedance bridge includes circuit means for determining the input (base-emitter) resistance of the transistor under test.

Another object of the present invention is the provision of a new and improved semiconductor in-circuit testing apparatus especially designed for determining the operating parameters of a diode semiconductor element in-circuit, and wherein said apparatus includes impedance bridge means and means for connecting said diode element in said bridge, means in said bridge for electronically balancing the bridge as a result of the potential effects caused therein by current passing through the impedance of the circuit associated with said diode element and for determining the circuit impedance of said associated circuit.

Another object of the present invention is the provision of a new and improved semiconductor in-circuit testing apparatus especially designed for determining the operating parameters of a diode semiconductor element in-circuit, and wherein said apparatus includes impedance bridge means and means for connecting said diode element in said bridge, means in said bridge for electronically balancing the bridge as a result of the potential effects caused therein by current passing through the impedance of the circuit associated with said diode element and for determining the circuit impedance of said associated circuit, means in said bridge for electronically balancing bridge as a result of the potential effects caused therein by the current passing through the dynamic input resistance of said diode and for determining the magnitude of said diode input resistance.

Additional objects and advantages of the testing apparatus for use in determining operating parameters of a semiconductor element in-circuit will be apparent to one skilled in the art to which it pertains, and upon reference to the following disclosure of the said invention, one preferred embodiment for practicing the same being illustrated in the accompanying drawings, wherein:

FIG. 1 is a schematic electrical wiring diagram of testing apparatus embodying the present invention;

FIG. 2 is a graphic diagram of the combined D.C. and A.C. signals used in the testing apparatus of FIG. 1; and, FIG. 3 is a graphic diagram of a pulsating D.C. signal having positive and negative going pulses which may be substituted for the signals shown in FIG. 2.

Briefly, the novel apparatus of the present invention for determining the operating parameters of a semiconductor element in-circuit incorporates the concept of isolating said element from its associated circuit without physically removing said element from the latter. With this accomplished, said semiconductor element then appears electronically as though it were literally out of its associated circuit whereby the operating parameters of the same may then be readily determined.

More specifically, for determining operating parameters of a transistor element the transistor in-circuit testing apparatus of the present invention includes an impedance bridge into which the transistor in-circuit is connected in a common-emitter amplifier circuit. As a first operating parameter, the input impedance of the transistor circuit connecting to the input electrodes of said transistor is determined by passing predetermined magnitude of alternating current through said bridge and transistor circuit with the transistor in a non-conductive state, then adjusting said connected impedance bridge so as to balance said bridge and thereby null or equalize therein the effects of the current flow through said input circuit impedance of said transistor circuit whereby the magnitude of said input circuit impedance may be directly determined. As a second operating parameter, the input resistance of the aforesaid transistor as connected in the common-emitter amplifier circuit (base to emitter) is determined by passing a predetermined magnitude of alternating current through said impedance bridge and the input (base-emitter) circuit of said transistor with the latter in a conductive state and with a predetermined magnitude of transistor output (collector-emitter) D.C. current, then adjusting said bridge so as to balance said bridge so as to null or equalize therein the effects of the alternate current flow through said transistor input (base-emitter) resistance whereby the magnitude of said transistor input resistance may be readily determined, and thereafter passing a predetermined magnitude of alternating input (base-emitter) current through said transistor and determining as a third parameter the alternating current gain, $$\text{Beta} \frac{\Delta I_c}{\Delta I_b}$$

in the output (collector-emitter) circuit of said transistor.
For measuring $$\text{Beta} \frac{\Delta I_c}{\Delta I_b}$$

as will be hereinafter described, in detail, the above steps are required to be carried out in the sequence herein set forth in using the testing apparatus of the present invention.

As will later be described in greater detail, a pulsating D.C. signal may be used in place of the alternating current and D.C. current potentials.

As one preferred embodiment of testing apparatus, especially designed to practice the present invention as is above defined, reference is now directed to the electrical wiring diagram of FIG. 1 illustrating said embodiment, and which is seen to include an impedance bridge circuit as is identified in its entirety by the reference numeral 10, and which comprises a pair of impedance branches 11 and 12, which are also commonly referred to in the art as ratio branches. The effective resistance of each of the impedances in ratio branches 11 and 12 is preferably equal to each other, the preferred magnitude of each of the same being hereinafter separately cataloged to disclose one preferred assembly. One end of each branch 11 and 12 is seen to be connected to each other to thus define a bridge junction A.

The impedance bridge 10 also includes a variable impedance branch 13, which is seen to comprise a pair of impedance circuits 13a and 13b connected in parallel to each other, one end of said parallel branch connecting in series with a condenser 14, the latter connecting in series with the opposite end of the aforementioned impedance branch 11 to thus define a bridge junction D. The condenser 14, as will later be described in greater detail, is of such magnitude as to appear as a short circuit to the aforementioned alternating current signal.

As previously mentioned, the transistor under test and its associated operative circuit are intended to be connected into the impedance bridge in such manner as to be in what is commonly known as a common-emitter amplifier circuit.

To accomplish this one end of lead 18 is connected in series with the opposite end of the impedance branch 13 to thus define a bridge junction B, and the opposite end of said lead is intended to be connected directly to the base electrode of the transistor, said electrode being identified at b.

The transistor under test is identified herein by the reference character T, said transistor and its associated circuit being identified in their entirety by the reference character X. The transistor circuit, as will be understood, may partake of various configurations, and is herein seen to include merely for purposes of disclosure, impedances $Z_1$ to $Z_4$, inclusive connected between the electrodes of said transistor.

A lead 20 is seen to have its one end connected in series with the opposite end of the impedance branch 12 to thus define a bridge junction C, and its opposite end connected directly to the emitter electrode e of said transistor.

A lead as is indicated at 22, has its one end connected directly to the emitter electrode of said transistor and its opposite end to a suitable source of D.C. potential 23. Lead 25 is seen to have its one end connected to the opposite side of the aforesaid source of D.C. potential 23 and its remaining end connected in series with a resistor element as is indicated by the reference character 27.

The opposite end of said resistor element 27 is connected by means of lead 28 in series with a suitable microammeter 30, said ammeter, in turn, being connected through lead 31 in series with the collector electrode c of said transistor.

As is herein indicated, the positive terminal of the source of D.C. potential 23 is connected to the emitter electrode e and its negative terminal is connected to the collector electrode c, thus indicating that the transistor under test is a PNP transistor. And, inasmuch as the emitter electrode e is common to both input and output circuits of the transistor T, said transistor as thus connected into the bridge 10 is connected in a "common-emitter" amplifier circuit as comprises the fourth branch of said bridge.

The branch 13 of the impedance bridge 10, as previously indicated, comprises a pair of impedance circuits 13a and 13b, connected in parallel one to the other.

Impedance circuit 13a is seen to include a variable potentiometer as is indicated at P1 connected in series with a manually operable electrical switch element SW2, said switch element having two operative positions, namely open and closed. In its closed position, the variable potentiometer is connected in series with the aforesaid condenser 14 and across bridge junctions D and B, whereas in its open position said potentiometer is disconnected from said junctions.

Impedance circuit 13b of said branch 13 is seen to comprise a resistor element Rm of predetermined fixed magnitude which is connected in series with a variable potentiometer P2, the latter, in turn, being connected in series with a suitable manually operable switch element SW1, said switch element likewise having two operative positions, namely open and closed. In its closed position, said circuit 13b is connected in series with said condenser 14 and across bridge junction B and D, and in its open position said circuit is disconnected from the latter.

A suitable source of D.C. energy, as is indicated at 40, is intended to be connected across the bridge junctions A and B to thus provide a suitable D.C. bias to the input (base-emitter) of the transistor. Said source is seen to be connected across a variable potentiometer 41, the adjustable arm 42 thereof, being connected to one side of a reversing switch 43. Said potentiometer is likewise seen to be provided with a center tap 44 which is connected to the opposite side of said reversing switch 43.

One side of the reversing switch 43 is connected by conductor 46 to the junction A of the impedance bridge 10, and in like manner, the opposite side of said reversing switch 43 is connected by conductor 47 to the junction B of said bridge.

With this circuit arrangement, a predetermined D.C. potential of preselected magnitude may be applied across bridge junctions A and B and hence across the (base-emitter) circuit of the transistor to thereby provide for the proper bias thereof.

For example, as is previously mentioned, the transistor under test as shown in FIG. 1 is PNP transistor thereby requiring that the positive terminal of the D.C. source 40 be connected to bridge junction A and hence to the emitter electrode *e* of the transistor T and the negative terminal of said source connected to bridge junction B and the base electrode *b* of said transistor.

And, as is well known, if the transistor T to be tested happens to be an NPN type, the positive terminal of the potential supply 23 would be required to be connected to the collector electrode *c* and its negative terminal to the emitter electrode *e*, whereas the positive terminal of the energy source 40 would be connected to the base electrode *b* and the negative terminal thereof connected to the emitter electrode *e*. The meter 30 would likewise be required to be reversed as will be understood.

A suitable resistor element 50 is preferably connected in series with the aforesaid lead 47 and bridge junction B being thus effective to substantially limit the A.C. current flow through said bias circuit.

The instant testing method and apparatus for practicing the said method also preferably utilizes an alternating current source of energy of a predetermined frequency, and for this purpose, a suitable oscillator, as identified at 52, and which preferably generates a signal of one thousand cycles, has its output connected across the primary winding 53 of a suitable transformer 54, a variable potentiometer 55 being connected in said primary circuit to thus provide for selectively varying the magnitude of said output.

The secondary 56 is seen to be connected by the aforesaid lead 46 between the reversing switch 43 and the bridge junction A being thus effective to transfer and apply a one thousand cycle signal across bridge junctions A and B and hence the input circuit (base emitter) of the transistor T.

A suitable impedance, such as a choke 60 may be connected in said signal input circuit, preferably across the aforementioned resistor element 50, being thus effective to give low D.C. impedance to the bridge and particularly to the branch containing the transistor T to be tested.

As is previously mentioned, the condenser 14 is of such magnitude as to appear as a short circuit to the 1000 cycle signal generated by the oscillator 52.

An A.C. voltmeter 70, preferably having an element capable of indicating a full scale deflection at a potential of five hundred microvolts, is utilized to obtain a visual measurement at several predetermined positions in the instant testing apparatus, said meter 70 being selectively connected across the terminals 1—1, 2—2 and 3—3, the purpose for which will be hereinafter explained in detail.

Having described one preferred embodiment of testing apparatus of the present invention, the manner in which the same is utilized to test a transistor in-circuit will now be explained in detail.

As previously mentioned, the transistor T under test is connected into the bridge circuit of the instant testing apparatus in a "common-emitter" amplifier circuit, the primary purpose of which is to determine the Beta of said transistor or the current amplification factor, also referred to in the art as the forward short-circuit current amplification factor. In accomplishing this primary purpose, several additional parameters, as previously mentioned, are also capable of being determined, namely, the input circuit impedance of the transistor circuit and the transistor input resistance.

With the transistor T thus connected, it is first required to establish a standard of one milliampere of D.C. collector current so that said transistor may be tested under standard bias conditions.

For this purpose, zero or reverse bias is applied to the input (base-emitter) circuit so that the transistor T is cut off or non-conductive. To accomplish this, the variable potentiometer 41 connected across the D.C. energy source 40 may be adjusted to give zero bias, or the reversing switch 43 may be operated to apply a reverse bias to said transistor input circuit effective to cut off the transistor.

With the transistor in a cut-off condition, the shunt leakage current flowing through the transistor circuit is noted on milliammeter 30.

With this value of leakage current thus noted, the transistor T is then forward biased to thereby conduct, and the variable potentiometer 41 is adjusted until an additional one milliampere of D.C. collector current is indicated on said meter 30. Under this condition, said meter 30 indicates the shunt leakage current plus said additional one milliampere of collector current.

To determine the magnitude of the impedance of the transistor input circuit, a reverse bias is applied to the transistor input circuit from the D.C. energy source 40 which is effective to cut off said transistor.

Switch SW1, in branch 13b of the bridge 10 is moved to its open position disconnecting branch 13b from bridge junctions B and D, and switch SW2 is closed to thereby connect bridge circuit 13a across said bridge junctions B and D.

The meter 70 is connected across test points (1—1) as shown in FIG. 1, and hence also across bridge junctions C and D.

If desired, the switches SW1, SW2 and 43 and meter 70 may be connected to a conventional multiple contact switch (not herein shown) whereby one manual movement of the same may accomplish all four adjustments.

The condenser 14 in impedance branch 13 of the bridge 10 blocks the D.C. from its branch circuits 13a and 13b and, since said condenser acts as a short circuit to said 1000 cycle signal, the impedance branch 13 appears to said alternating signal to be comprised of pure resistance elements whereby the bridge acts as a D.C. bridge to said signal.

Next, the variable potentiometer 55 is adjusted to give a predetermined reading on the meter 70, preferably a half-scale reading, 250 millivolts.

The potentiometer P1 is then adjusted to indicate a null reading on the meter 70 which therefore indicates that the bridge is in balance and the A.C. current flow in bridge circuit 13a equals the A.C. current flow in the transistor input circuit since the impedances in the ratio branches 11 and 12 of the bridge 10 are preferably equal in magnitude as is previously mentioned.

When this balance occurs, the magnitude of resistance of potentiometer P1 equals the impedance of said transistor input circuit, and with said potentiometer being preferably calibrated in ohms, said magnitude may be directly obtained.

The next step is to determine the transistor input resistance (base-emitter). For this purpose, said transistor is first forward biased so as to be able to conduct and provide a one-milliampere of D.C. collector current. Meter 30 thus indicates the aforementioned circuit leakage current plus the one-milliampere of collector current.

The switch SW1 is then closed so as to connect the branch circuit 13b in parallel with branch circuit 13a and across bridge junctions B and D.

The potentiometer 55 is then adjusted to provide an A.C. signal across bridge junctions A and B sufficient to provide a suitable indication on the meter 70, the latter being connected across test points 1—1 or bridge junctions C and D.

The potentiometer P2 is then adjusted to give a null reading on said meter 70 which indicates that the bridge is in balance, and hence the total A.C. current flowing through branch circuits 13a and 13b of the bridge 10 equals the A.C. current flow through the transistor external input circuit and the transistor input resistance. And since the A.C. current flow through the branch circuit 13a had previously been determined to equal the A.C. current flow through the transistor external input circuit, the A.C. current flow through the branch circuit 13b thus equals the A.C. current flow through the transistor input resistance (base-emitter) and, with the bridge in balance, the sum of the resistances R$m$ plus P2 thereby equals the transistor input resistance.

To next determine Beta, the current amplification factor of the transistor T in its common-emitter amplifier circuit, the meter 70 is first connected across the test points (2—2) thus paralleling said meter with the resistance element R$m$ in branch circuit 13$b$.

With the selection of values for the several components of the instant bridge assembly as will be later defined, it is preferred that the resistance element R$m$ have a value of fifty ohms.

With the meter 70 thus connected and the transistor T conducting with a standard one milliampere of D.C. collector current, and the bridge in balance as in the previous test to determine the transistor input resistance, the potentiometer 55 is again adjusted so that the meter 70 indicates exactly a one-half scale reading so that exactly two-hundred fifty microvolts are applied across resistance element R$m$. Consequently, an A.C. current flow of exactly five microamperes flows through said element R$m$ and hence likewise equals the A.C. current flow through the input (base-emitter) circuit of transistor T.

The meter 70 is then connected across the test points 3—3 paralleling said meter with the resistance element 27 in the transistor output circuit (collector-emitter).

The resistance element 27 is preferably one-half ohm in magnitude, being thus effective to substantially short circuit or be predominate in the transistor output circuit (collector-emitter).

Meter 70 will therefore indicate the potential drop across resistance element 27, and as will be readily understood, a Beta scale may be calibrated on said meter so that said voltage indication may be interpreted directly in Beta$1$ units.

For example, as previously mentioned the element of meter 70 is preferably capable of providing a full scale deflection under an impressed voltage of five-hundred microvolts. With an indication of a one-half scale reading or two hundred fifty microvolts across the resistance element 27 it will therefore indicate that the A.C. current flow through said element 27 is five-hundred microamperes which is the A.C. output current of the transistor, or as is also referred to as $I_c$ with said transistor in a common-emitter circuit.

Consequently with an A.C. current of five microamperes flowing through the transistor input circuit (base-emitter), or $I_b$, and an output A.C. current of five hundred microamperes $I_c$, Beta then equals $$\frac{\Delta I_c}{\Delta I_b} \frac{500}{5} \text{ or } 100$$

Therefore one-half scale deflection of meter 70 equals a Beta reading of 100 and a full scale deflection equals a Beta reading of 200. A suitable Beta scale may therefore readily be calibrated for the meter 70.

Reviewing the method in which the transmitter testing apparatus of the present invention as is now described is operable to determine Beta of a transistor in circuit, it will now be understood that the following operations or steps must be performed in the following sequence:

(1) With the transistor connected to the apparatus, the collector current $I_c$ is standardized—a magnitude of one milliampere D.C. being the preferred value therefore;

(2) The impedance of the transistor input circuit is determined—the bridge being balanced, as above described, whereby the magnitude of the resistance of the potentiometer $P_1$ in branch circuit 13$a$ thus equalling said input circuit impedance;

(3) The input resistance of the transistor is next determined—the bridge being again balanced in the manner above described, whereby the sum of the resistance R$m$ and $P_2$ in branch circuit 13$b$ thus equalizing the magnitude of said transistor input resistance.

(4) The meter 70 is connected across test points 2—2 and the resistance element R$m$ to thereby provide an A.C. current flow of known value through the resistance R$m$ and consequently through the input (base-emitter) circuit of the transistor—the potentiometer 55 being adjusted to provide this value of A.C. current and to also provide a calibration reading—preferably half-scale on the Beta scale of meter 70.

(5) The meter 70 is connected across test points 3—3 paralleling the meter with the resistance element 27 in the transistor output circuit wherein the Beta value as above defined is read directly from the Beta scale on said meter.

In each of the steps 1 to 5 performed in the sequence just described, when going from one step to the other the adjustments made to the variable potentiometers 41, $P_1$ and $P_2$ in the last previous step must be left in their adjusted position. For example, when going from step 1 to step 2, the adjustment made to potentiometer 41 to provide one milliampere of D.C. collector current whereby the meter 30 indicates said one milliampere plus the shunt leakage current, said potentiometer 41 is left at said adjusted position. In like manner, when going for example from step 3 to step 4 as above described, the adjustments previously made to the potentiometers $P_1$ and $P_2$ in steps 2 and 3 respectively, are also retained.

In FIG. 2 is shown the resultant effect of the voltage wave forms of the D.C. bias voltage of the battery source 40 when combined with the A.C. voltage (1000 cycle signal) of the oscillator source 52 for use in measuring the operating parameters of both NPN and PNP transistors in circuit.

For example, in testing an NPN transistor in circuit, to determine the input resistance of the same as above described, a plus bias voltage is applied to the base electrode of the transistor when said transistor is to be turned "on," and the A.C. signal is superimposed on said plus D.C. bias voltage, said combined signal being thus shown at "$a$" in FIG. 2.

Likewise, when the input impedance of the NPN transistor input circuit is to be determined in the manner as is above described, said transistor is "cut off" by a reverse or negative bias voltage being applied to said base electrode and the A.C. signal is then superimposed on said negative bias voltage. This combined signal is shown at "$b$" in FIG. 2.

Although not herein shown, the battery source 40 and oscillator 52 may be replaced by a conventional pulse generator, the output of which comprises identical pulsating signals of positive and negative polarity such as is shown in FIG. 3 and which may be connected across bridge junction A and lead 47.

In this instance, the pulsating signal provides a bias potential and a signal potential for determining the operating parameters of the transistor T in circuit.

For example, in determining the operating parameters of an NPN transistor T in circuit, the negative going pulsating signal at "$b$" in FIG. 3 is utilized and applied to the base electrode $b$ to "turn off" the transistor so that the shunt leakage current of the transistor circuit may be determined.

Thereafter, the positive going pulsating signal at "$a$" in FIG. 3 is used to "turn on" the PNP transistor so that the standard one milliampere of D.C. collector current may be established. This is accomplished by adjusting the amplitude of the pulsating signal until the meter 30 indicates one milliampere plus the shunt leakage current as in the previous testing method.

The aforementioned conventional pulse generator is of the type wherein by adjustment of the amplitude of the pulsating signal, the amplitude of both positive and negative pulses are equally adjusted.

Thereafter, with the amplitude of the signal thus adjusted, the negative going pulses of the signal as at "$b$" in FIG. 3 may be used to "turn off" the transistor T, and the bridge then balanced in impedance branch 13a in the same manner as previously described so as to determine the magnitude of the transistor input circuit.

In like manner, the adjusted positive pulsating signal at "a" in FIG. 3, may thereafter be used to "turn on" the transistor T to determine the transistor input resistance. In this instance the impedance branch 13b is connected into the bridge circuit as in the previous testing method, and the potentiometer $P_2$ is adjusted to balance the bridge so that the resistance $Rm$ plus $P_2$ equals the transistor input resistance.

The positive going pulsating signal as at "a" in FIG. 3 as thus adjusted, may thereafter be used in identically the same manner as in the previous testing method to determine the Beta $$\frac{\Delta I_c}{\Delta I_b}$$

of the transistor.

As will likewise be realized by the artisan, when testing PNP transistors in-circuit, the opposite polarity of pulsating signal is used when it is desired to turn the transistor off or on during the testing of the same. For example, to "turn on" a PNP transistor a negative going pulse as at "b" in FIG. 3 is used, whereas a positive going pulse as at "a" is used to "turn off" a PNP transistor.

As will now be realized the instant testing apparatus is also capable of determining the value of Beta for a transistor out of its associated circuit.

In this instance, the transistor is connected to the testing apparatus in the same manner as above described, however the switch SW2 in branch circuit 13a is opened and the method step as is above identified as step 2, the step to determine the input circuit impedance of the associated transistor circuit, is omitted.

The operating parameters of a diode semiconductor element, not herein shown, may likewise be determined by the instant testing method and apparatus as will now be recognized.

In this instance, the two diode electrode elements are connected across the bridge conductors 18 and 20 to comprise the one branch of the impedance bridge.

Thereafter, with the diode reversed biased to its "cutoff" condition, substantially the same procedure as above outlined is followed to determine the input circuit impedance of the circuit associated with said diode, the magnitude of the resistance reading on potentiometer $P_1$ in impedance branch 13a equalling the magnitude of the input impedance of the diode circuit.

Then, with the diode in its forward biased "on" condition, the same procedure as above outlined is followed to determine the dynamic input resistance of the diode, the magnitude of the sum of resistance $Rm$ and $P_2$ equalling the magnitude of said diode dynamic input resistance.

The preferred magnitude of each of the elements of the bridge 10 as will now be cataloged is selected so as to be operable within the present range of semiconductor operating parameters that has been established by the manufacturer, and it is to be understood that said elements may be changed so as to correspond to changes in said range of parameters.

In the following list of said bridge elements, the reference character used to identify the same in the electrical wiring diagram is likewise used for identification herein.

| Element: | Value |
|---|---|
| 11 resistance element _____ohms__ | 100 or 1000 |
| 12 resistance element _____do____ | 100 or 1000 |
| $Rm$ resistance element _____do____ | 50 |
| P1 variable potentiometer _____do____ | 0–100,000 |
| P2 variable potentiometer _____do_____ | 0–10,000 |
| 27 resistance element _____do____ | 0.5 |
| 50 resistance element _____do____ | 5,000 |
| 60 inductance element _____henries__ | 12 |

With the transistor current amplificator factor and the transistor input resistance thus determined with said transistor connected in a common-emitter amplifier circuit, said operating parameters may then be utilized as is well known to the artisan to determine the same operating parameters of said transistor in a CB, common-base circuit configuration or a CC, common-collector circuit configuration.

Having thus described in detail the novel testing apparatus for practicing the said method of testing a semiconductor element in-circuit, it will be realized that the same are susceptible to various modifications and combinations without departing from the invention concepts thereof as are defined in the claims.

What is claimed is:

1. Apparatus for determining operating parameters of a transistor in its associated circuit, comprising an impedance bridge circuit having first, second, third and four impedance branches, said third and fourth impedance branches being of equal impedance, means for connecting the base, emitter and collector electrodes of said transistor in a common-emitter amplifier circuit in said first impedance branch of said bridge, power supply means for providing a predetermined magnitude of direct current to said bridge and the transistor input circuit of said associated transistor circuit, switch means for selectively connecting said power supply means in a reverse and forward bias relation with said transistor effective to selectively turn off and turn on said transistor, measuring means for determining the leakage current of said transistor while it is in said off condition and for measuring the collector current of said transistor when said transistor is turned on, the second branch of said bridge comprising a first impedance network and a second impedance network connected in parallel with each other, signal means for delivering a test signal to said bridge and said transistor, adjusting means for adjusting the value of impedance in said first network with said transistor turned off and said second network in an open-circuit condition effective to balance said bridge whereby the adjusted value of impedance in said first network represents the value of impedance of the transistor input circuit, adjusting means for adjusting the value of impedance in said second network with said transistor turned on and said second network in a closed-circuit condition and with said first network in said previously adjusted condition effective to balance said bridge whereby the adjusted value of said impedance in said second network represents the value of impedance of the transistor input resistance, means for measuring the magnitude of electrical current passing through the adjusted impedance in said second network which current represents the base current of said transistor, and means in the output circuit (collector-emitter) of said transistor responsive to collector current flow to indicate the current gain $$\frac{\Delta I_c}{\Delta I_b}$$

of said transistor.

2. Apparatus for determining operating parameters of a transistor in its associated circuit as is defined in claim 1 and wherein the power supply means and current supply means provide a pulsating direct current signal.

References Cited by the Examiner

UNITED STATES PATENTS

| 2,578,455 | 12/1951 | Seely _____ | 324—62 |
| 2,866,948 | 12/1958 | Witt _____ | 324—62 |
| 2,925,554 | 2/1960 | Hayes _____ | 324—57 |
| 2,932,789 | 4/1960 | Drubin et al. _____ | 324—57 |

(References on following page)

OTHER REFERENCES

"Electrical Measurement Analysis," Ernest Frank, McGraw-Hill Book Company, Incorporated, New York, 1959.

Electronics (Gracoletto), vol. 26, November, 1953, pp. 144–147.

"In-Circuit Transistor Testing," Radio Electronics, September, 1961, pp. 66–68.

Institute of Electrical Engineers (Stephen et al.), vol. 101, No. 73, September, 1954, pp. 288–293.

Proceedings of the IRE (Methods of Testing Transistors), November, 1956, pp. 1542–1561.

WALTER L. CARLSON, *Primary Examiner.*

SAMUEL BERNSTEIN, *Examiner.*

GARY S. KINDNESS, EDWARD L. STOLARUN, *Assistant Examiners.*